(12) United States Patent
Choe et al.

(10) Patent No.: US 11,704,988 B2
(45) Date of Patent: Jul. 18, 2023

(54) GROUP LEADER SELECTION METHOD, AND USER SAFETY MONITORING SYSTEM AND METHOD

(71) Applicant: THE CATHOLIC UNIVERSITY OF KOREA INDUSTRY-ACADEMIC COOPERATION FOUNDATION, Seoul (KR)

(72) Inventors: Sang Ho Choe, Gyeonggi-do (KR); Young Hyeon Jang, Incheon (KR); Jung Ho Ahn, Gyeonggi-do (KR); Jun Beom Lee, Gyeonggi-do (KR); Nam Hong Kim, Incheon (KR)

(73) Assignee: The Catholic University of Korea Industry—Academic Cooperation Foundation, Seoul (KR)

( * ) Notice: Subject to any disclaimer, the term of this patent is extended or adjusted under 35 U.S.C. 154(b) by 0 days.

(21) Appl. No.: 17/756,143

(22) PCT Filed: Sep. 2, 2020

(86) PCT No.: PCT/KR2020/011753
§ 371 (c)(1),
(2) Date: May 18, 2022

(87) PCT Pub. No.: WO2021/101031
PCT Pub. Date: May 27, 2021

(65) Prior Publication Data
US 2022/0415152 A1    Dec. 29, 2022

(30) Foreign Application Priority Data

Nov. 19, 2019 (KR) .................. 10-2019-0148865
Nov. 19, 2019 (KR) .................. 10-2019-0148866

(Continued)

(51) Int. Cl.
*G08B 23/00* (2006.01)
*G08B 21/02* (2006.01)
(Continued)

(52) U.S. Cl.
CPC ........... *G08B 21/02* (2013.01); *G08B 25/007* (2013.01); *G08B 25/016* (2013.01)

(58) Field of Classification Search
CPC .... G08B 21/02; G08B 25/007; G08B 25/016; F16P 3/142; F16P 3/147; G06Q 10/06; G06Q 10/10
(Continued)

(56) References Cited

U.S. PATENT DOCUMENTS 7,557,701 B2 * 7/2009 Numazaki ............ G08B 25/016
701/1
2019/0122036 A1 * 4/2019 Ward ................ G06Q 10/06393
(Continued)

FOREIGN PATENT DOCUMENTS

JP    2009-147683 A    7/2009
KR    10-2008-0008852 A    1/2008
(Continued)

*Primary Examiner* — Tai T Nguyen
(74) *Attorney, Agent, or Firm* — Edwin A. Sisson, Attorney at Law, LLC; Jeffrey J. Banyas

(57) ABSTRACT

The present invention relates to a system and method for monitoring the safety of users in a shaded area, wherein location information about an RFID post installed in a shaded area is identified by means of an RFID tag, so that the location of a work group working in the shaded area can be transmitted to a control server in real time, and the control server compares the location of the work group with operation information about trains, thereby determining whether the work group is in danger or not, makes notification the same, so that the safety of the work group can be secured.

22 Claims, 8 Drawing Sheets

(30) Foreign Application Priority Data

Dec. 16, 2019 (KR) .......................... 10-2019-0167982
Jan. 9, 2020 (KR) .......................... 10-2020-0003354

(51) Int. Cl.
*G08B 25/00* (2006.01)
*G08B 25/01* (2006.01)

(58) Field of Classification Search
USPC ....................................................... 340/573.1
See application file for complete search history.

(56) References Cited

U.S. PATENT DOCUMENTS

2021/0084436 A1* 3/2021 Sutherland .......... H04L 63/0853
2021/0350312 A1* 11/2021 Swift ............... G06Q 10/06313

FOREIGN PATENT DOCUMENTS

| KR | 10-2010-0022815 A | 3/2010 |
| KR | 10-1432256 B1 | 8/2014 |
| KR | 10-2015-0100065 A | 9/2015 |
| KR | 10-2016-0023054 A | 3/2016 |
| KR | 10-1671209 A | 10/2016 |
| KR | 10-2018-0031908 A | 3/2018 |

* cited by examiner

[FIG. 1]
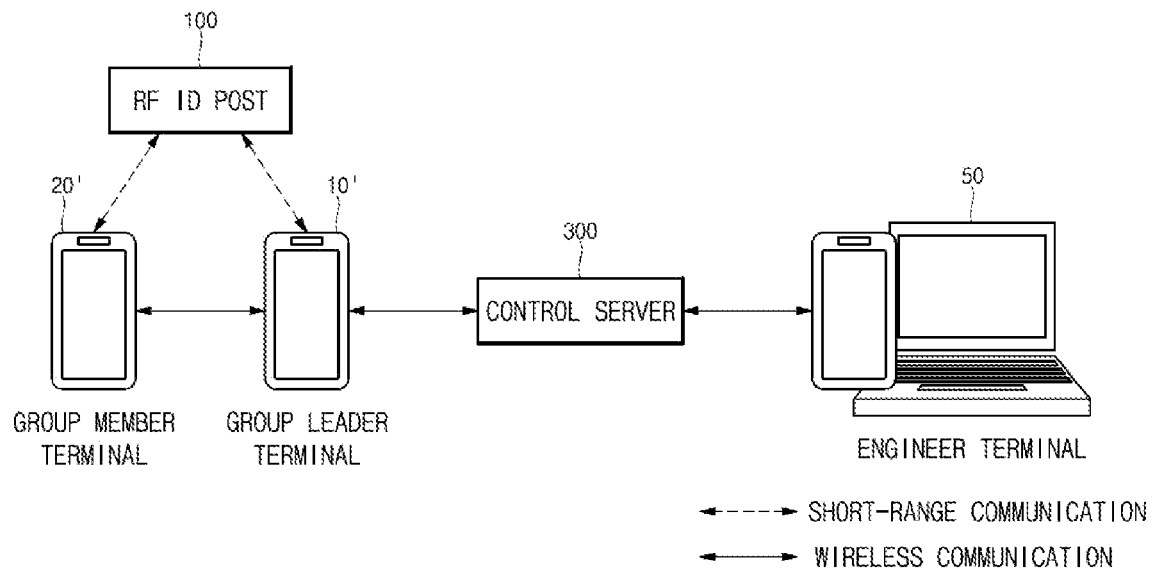
[FIG. 2]
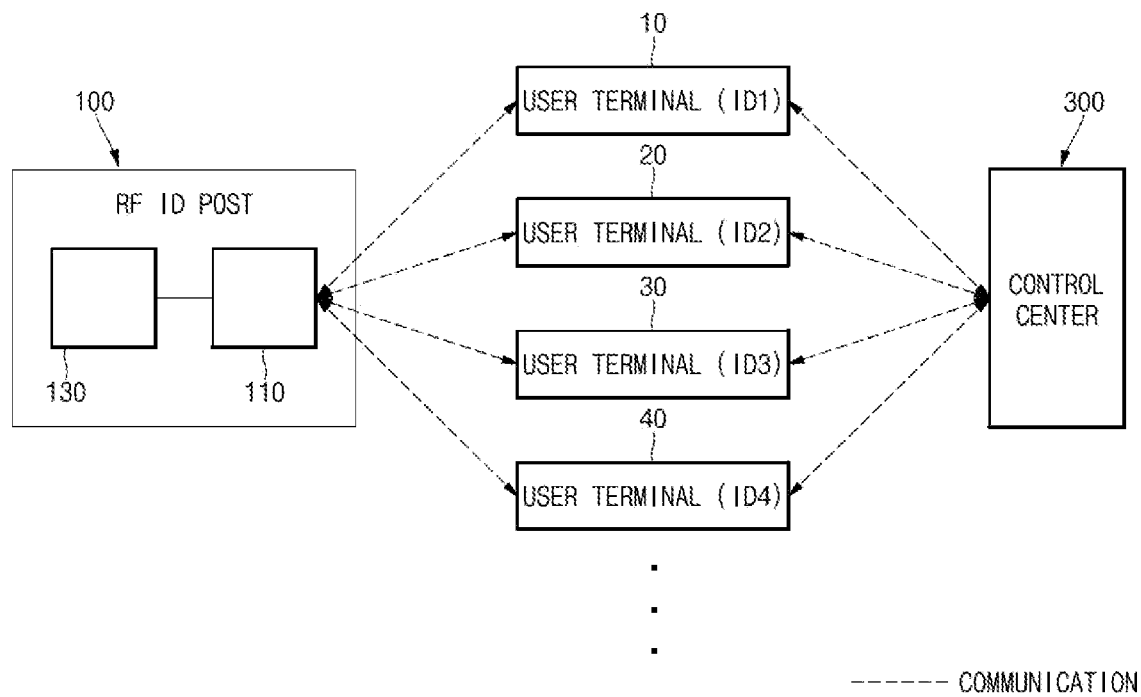

[FIG. 3]
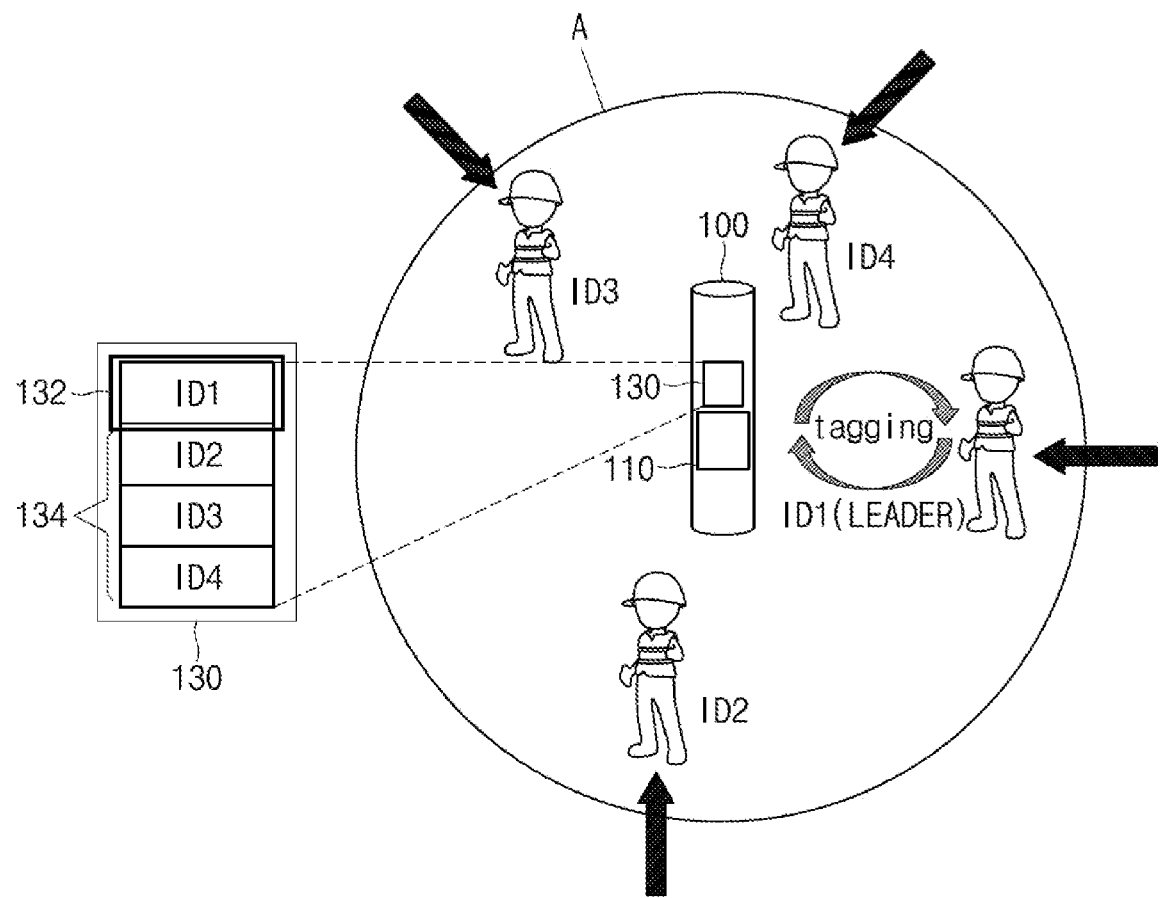

[FIG. 4]
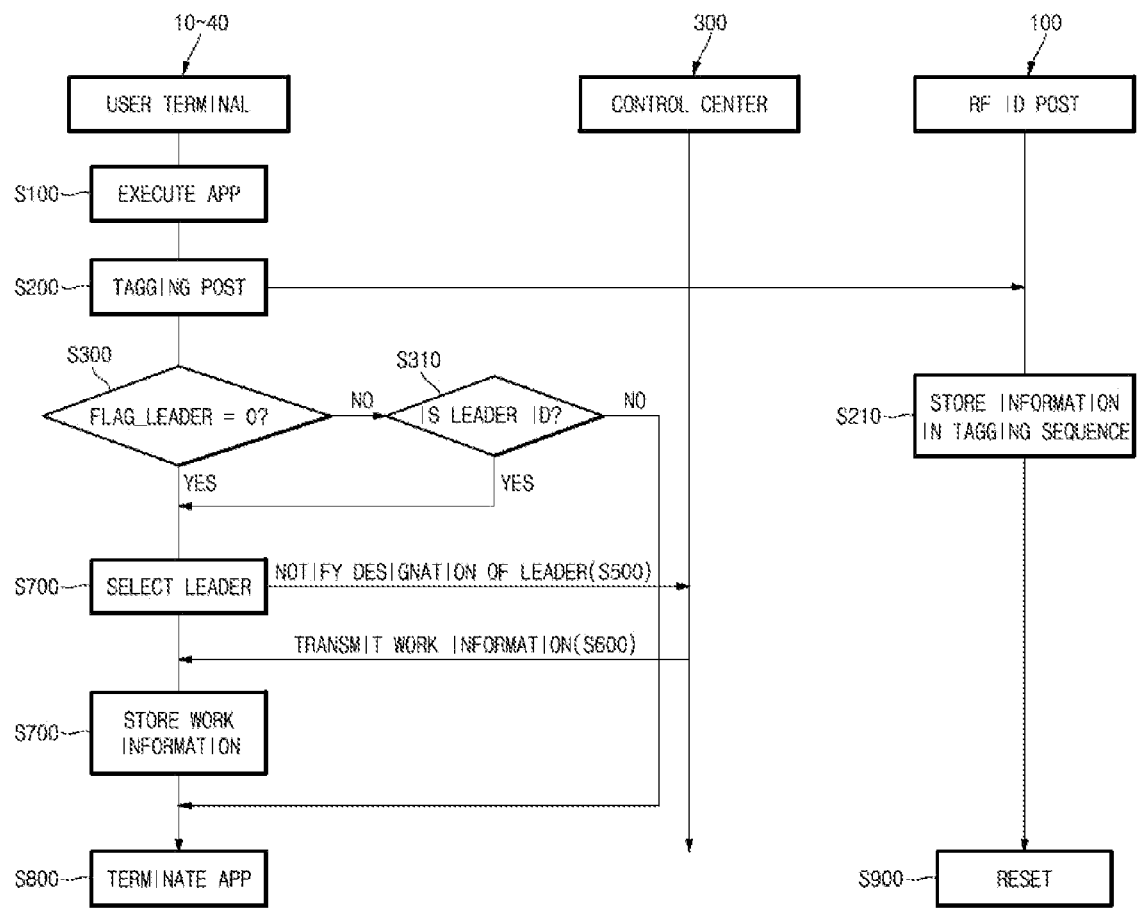

[FIG. 5]
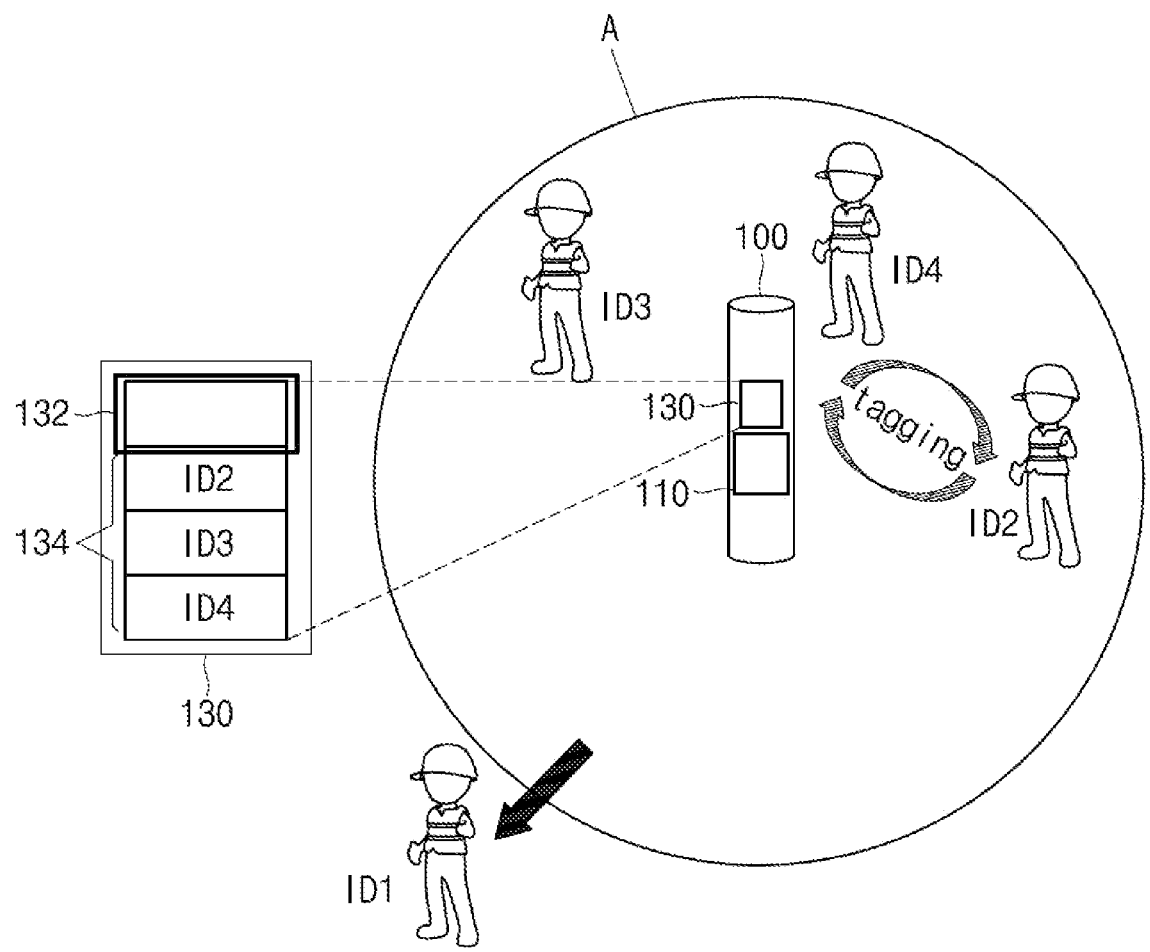

[FIG. 6]
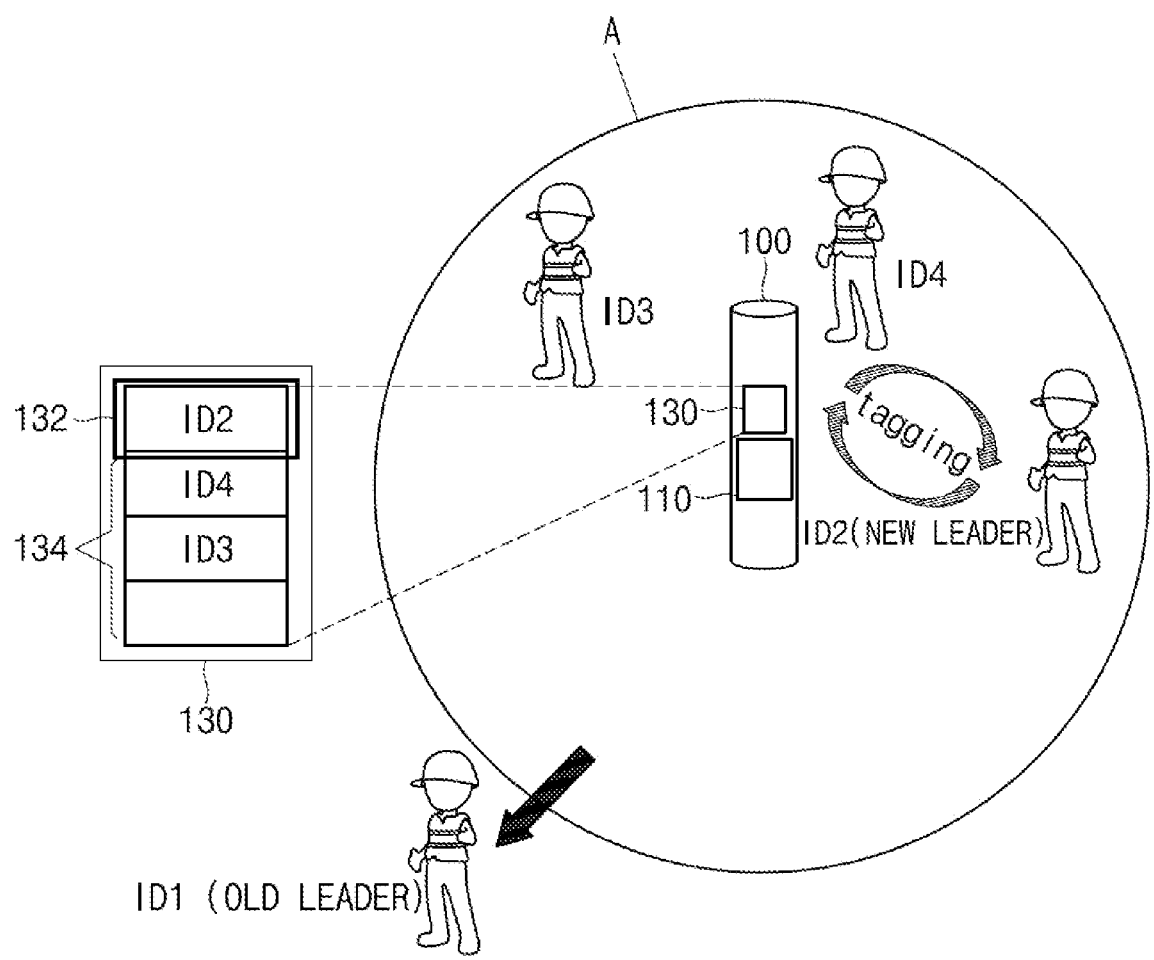

[FIG. 7]
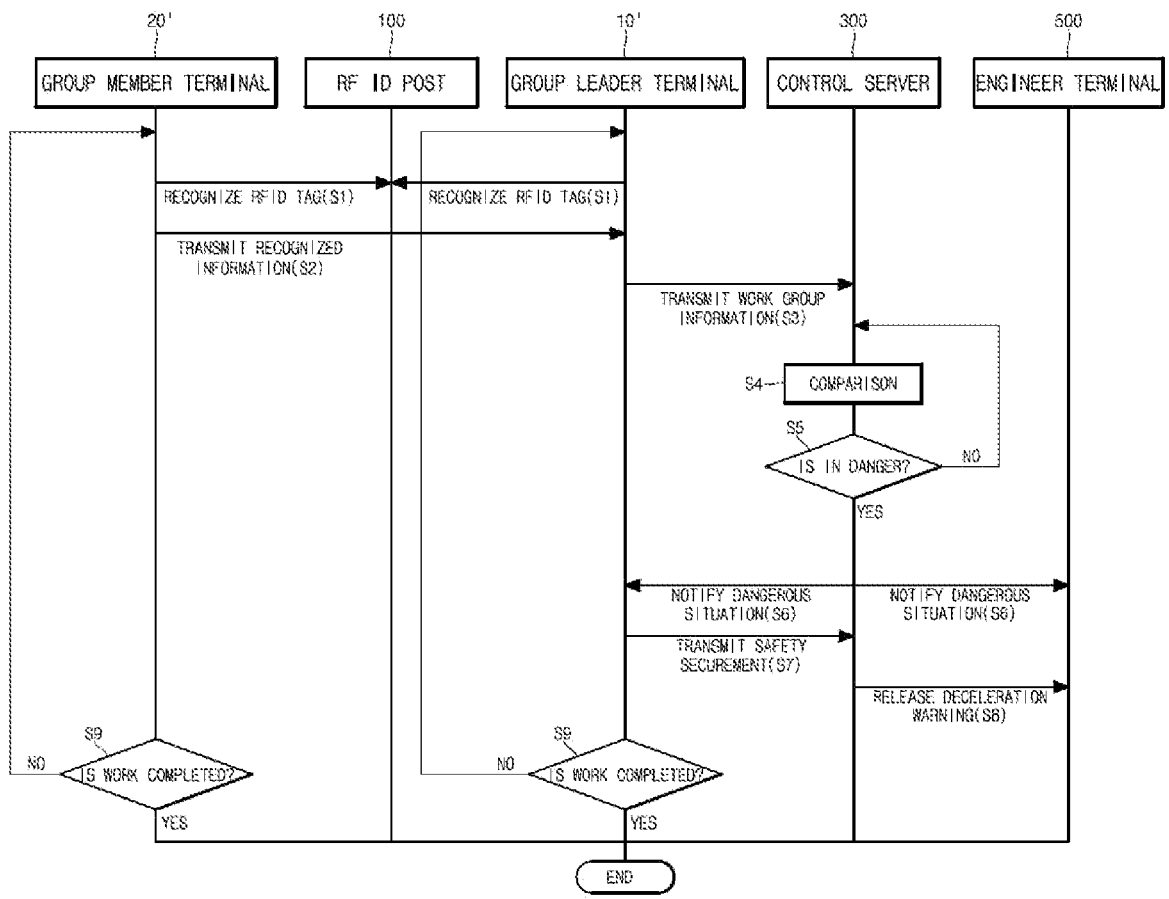

[FIG. 8]
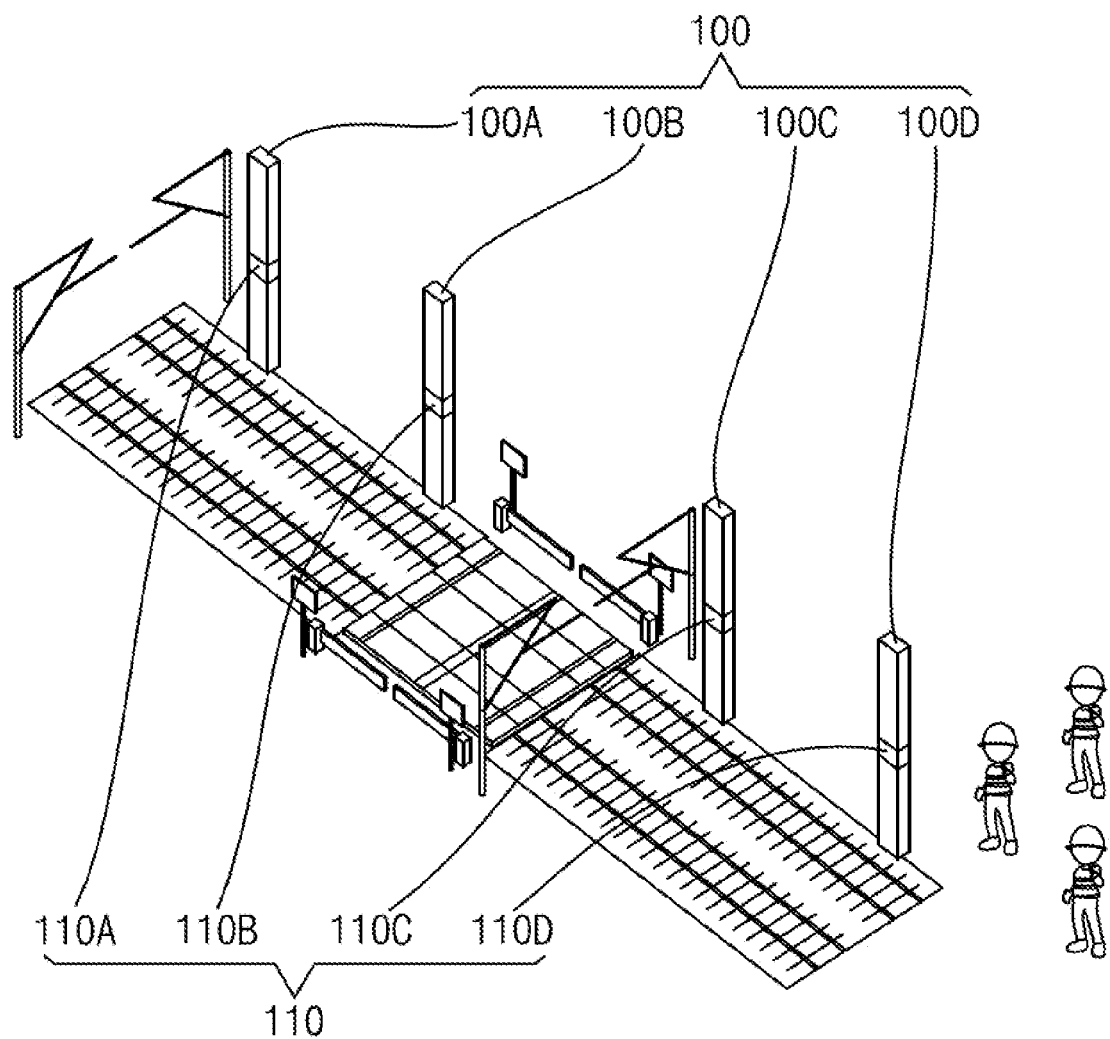

[FIG. 9]
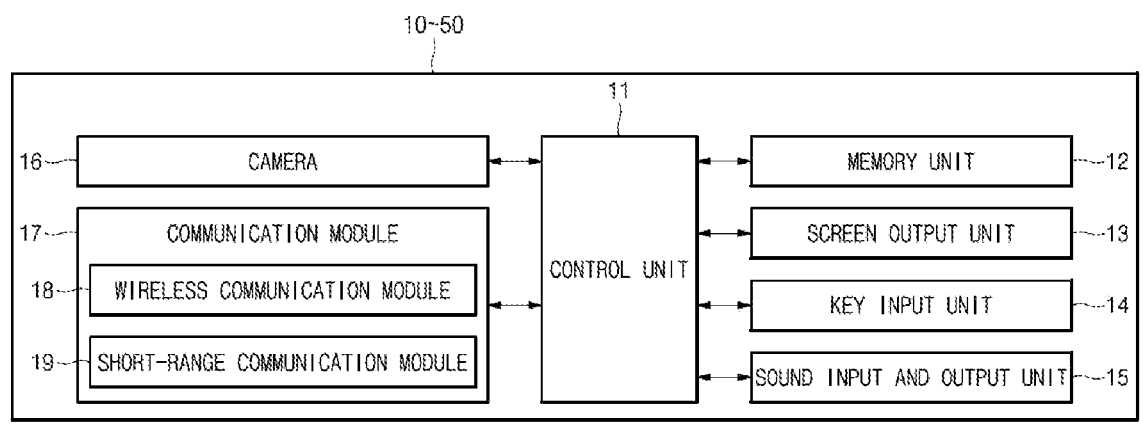
[FIG. 10]
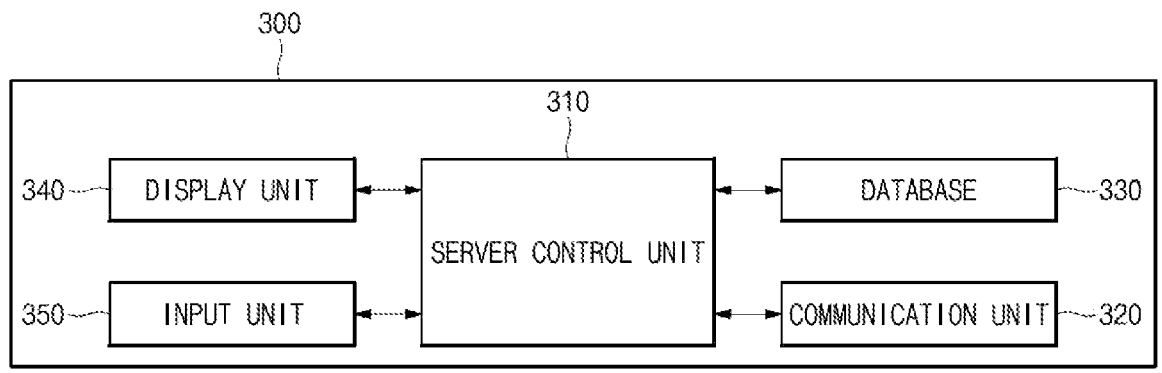

GROUP LEADER SELECTION METHOD, AND USER SAFETY MONITORING SYSTEM AND METHOD

PRIORITIES AND CROSS REFERENCES

This Application claims priority from International Application No. PCT/KR2020/011753 filed on 2 Sep. 2020, Republic of Korea Application No. 10-2020-0003354 filed on 9 Jan. 2020, Republic of Korea Application No. 10-2019-0167982 filed on 16 Dec. 2019, Republic of Korea Application No. 10-2019-0148866 filed on 19 Nov. 2019, and Republic of Korea Application No. 10-2019-0148865 filed on 19 Nov. 2019 the teachings of each of which are incorporated by reference herein in their entirety.

TECHNICAL FIELD

Various embodiments of the present invention relate to a group leader selection method, and a user safety monitoring system and method thereof in a shaded area.

BACKGROUND ART

In general, work performed in the shaded area where global positioning system (GPS) transmission and reception is not smooth, such as underground or a tunnel, may be performed within the working time agreed between a space manager and a user.

However, working within the shaded area may be difficult to determine a location of a user through GPS in real time.

In addition, in the case of work performed within a track in the shaded area, an accident may occur to the user due to the occurrence of an unexpected emergency situation. When the accident occurs or the working time is delayed and the working time agreed between the user and the space manager is exceeded, the train may be operated within the track. In this case, since an engineer of the train operating within the track cannot determine the location of the user, it may not be possible to secure a safe distance from the user, and an additional accident may occur due to the train running.

DISCLOSURE OF THE INVENTION

Technical Problem

An object of the present invention is to provide a group leader selection method using an external wireless shared memory that enables selection of a group leader within a user group, and transmission and reception of work information and remote monitoring through the leader.

In addition, an object of the present invention is to provide a user safety monitoring system and method thereof in a shaded area, in which a location of a work group can be transmitted to a control server through location information about an RFID post stored in an RFID tag in real time, and the control server compares the location of the work group with operation information about the train to determine whether or not the work group is in danger and make notification the same, so that the safety of the work group can be secured.

In addition, an object of the present invention is to provide a user safety monitoring system and method thereof in the shaded area, in which the control server can receive the location and work group information of all users by communicating with one group leader terminal, and thus communication and management efficiency can be improved.

Technical Solution

According to an aspect of the present invention, there is provided a user safety monitoring method in a shaded area including an RFID recognition step of recognizing, by each of user terminals, a short-range wireless communication tag mounted on a short-range communication post installed in a work area and automatically selecting a group leader terminal from among the user terminals, an identification information transmission step of transmitting, by group member terminals among the user terminals, identification information to the group leader terminal, a work group information transmission step of transmitting, by the group leader terminal, work group information including the identification information received from the group member terminal and identification information of the group leader terminal to a control server, a comparison step of comparing, by the control server, the work group information and train operation information to calculate a result value, a step-of-determining-whether-dangerous situation-is-present of determining whether the work group is in danger, by the control server, by comparing the result value with a reference time, and a notification step of notifying the group member terminal, the group leader terminal, and an engineer terminal of a danger situation when the control server determines that the work group is in danger.

It is characterized in that in the RFID recognition step, the group member terminal and the group leader terminal receive location information of the short-range communication post from the short-range wireless communication tag mounted on the short-range communication post.

It is characterized in that in the identification information transmission step and the work group information transmission step, the identification information and the work group information are transmitted at a constant period, respectively.

It is characterized in that when the group member terminal or the group leader terminal deviates from the work area, by notifying the work area deviation through a notification sound, the group member terminal or the group leader terminal is induced to return to the work area, and when the group member terminal or the group leader terminal returns to the work area, the group member terminal or the group leader terminal recognizes the short-range wireless communication tag of the short-range communication post again and is included in the work group.

It is characterized in that when the group leader terminal deviates from the work area, one terminal among the user terminals is automatically selected as a new group leader terminal.

It is characterized in that a user ID recognized by the user terminals is automatically stored in the short-range wireless communication tag, a recognition state is maintained when the user terminals are located within a cell coverage of the short-range communication post within a recognition reference time, the user ID stored in the short-range wireless communication tag is automatically expired when the recognition reference time elapses, and the user terminals are required to periodically re-recognize the short-range wireless communication tag of the short-range communication post installed in the work area before the recognition reference time elapses in order to work in the work area.

It is characterized in that in the comparison step, the control server compares a location and time information of the work group in the work group information received from the group leader terminal and a location and time information of a train in train operation information extracted from a database of the control server, and calculates a result value that is a difference between the time at which users are located in the work area and the time when the train is expected to arrive in the work group.

It is characterized in that in the step-of-determining-whether-dangerous situation-is-present, when the result value is equal to or shorter than the reference time, the control server determines that it is a dangerous situation.

It is characterized in that in the notification step, the control server requests the engineer terminal to decelerate and operate the train.

It is characterized in that the method further includes, after the notification step, a safety securement transmission step of transmitting, by the group leader terminal, safety securement information indicating that all users included in the work group have secured a safe distance from the work area to the control server, and a deceleration warning release step of requesting, by the control server, the engineer terminal to release a deceleration warning of the train and operate in a normal running.

The identification information includes a user ID consisting of a group ID and a personal ID for each user, location information of the short-range communication post, and a recognition time at which the short-range wireless communication tag is recognized.

The work group information includes the number of people in the work group, a group ID, a personal ID for each user, location information for each user, and a current time.

In addition, according to an aspect of the present invention, there is provided a group leader selection method including a step of sequentially tagging a plurality of first to N-th user terminals belonging to a preset group to a short-range wireless communication tag of a short-range communication post within a predetermined coverage (S200), a step of determining, by each of the user terminals, whether a high-order memory in a memory of the short-range communication post is empty (flag_leader=0) (S300), a step of selecting a user terminal that has identified that the high-order memory is empty as a group leader if the high-order memory is empty in the step S300 (S400), a step of transmitting identification information of the user terminal selected as the group leader to the control server (S500), and a step of transmitting work information from the control server to the user terminal selected as the group leader (S600).

It is characterized in that in the steps S400 to S600, a status of the group leader is maintained while the first user terminal is tagged with the short-range wireless communication tag according to a preset tagging period $T_L$.

It is characterized in that in the memory, the group leader selection information is reset when a preset reset period $T_M$ comes.

It is characterized in that the tagging period $T_L$ is shorter than the reset period $T_M$.

The method further includes a step of executing a user app before the step S200 (S100), a step of storing the identification information of the user terminal in the memory of the short-range communication post between the steps S200 and S300 according to a tagging sequence (S210), and a step of storing the work information in the user terminal selected as the group leader after the step S600 (S700).

In addition, according to an aspect of the present invention, there is provided a group leader selection method including a step of sequentially tagging a plurality of first to N-th user terminals belonging to a preset group to a short-range wireless communication tag of a short-range communication post within a predetermined coverage (S200), a step of storing identification information of the user terminal in a memory of the short-range communication post according to a tagging sequence (S210), a step of reading a memory value of the short-range communication post and comparing the memory value with a preset criterion in an app of the user terminal (S300), a step of selecting any one of the plurality of user terminals as a group leader according to the preset criterion (S400), a step of transmitting identification information of the user terminal selected as the group leader to the control server (S500), and a step of transmitting work information from the control server to the user terminal selected as the group leader (S600).

It is characterized in that in the step S300, the user terminal that is initially tagged with the short-range wireless communication tag is selected as the group leader.

It is characterized in that in the steps S400 to S600, a status of the group leader is maintained while the first user terminal is tagged with the short-range wireless communication tag according to a preset tagging period $T_L$.

It is characterized in that in the memory, the group leader selection information is reset when a preset reset period $T_M$ comes.

It is characterized in that the tagging period $T_L$ is shorter than the reset period $T_M$.

Advantageous Effects

According to an embodiment of the present invention, since a post mounted with an RFID tag is disposed for each work division unit, a group leader is automatically selected by a user having a unique ID tagging the post, and thus the group leader is always present in the work group. Accordingly, it is possible to solve problems such as omission of information transmission due to the absence of the group leader.

In addition, since transmission of various work information and remote monitoring from the control sensor becomes possible through the group leader, accurate work is always possible according to work instructions, and there is an effect of improving work efficiency and control efficiency.

In the present invention, the location of a work group can be transmitted to the control server through location information about the RFID post stored in the RFID tag in real time, and the control server compares the location of the work group with operation information about a train to determine whether or not the work group is in danger and make notification the same, so that the safety of the work group can be secured.

In the user safety monitoring system and method thereof in the shaded area according to various embodiments of the present invention, the control server can receive the location and work group information of all users by communicating with one group leader terminal, and thus communication and management efficiency can be improved.

BRIEF DESCRIPTION OF THE DRAWINGS

FIG. 1 is a configuration diagram illustrating a user safety monitoring system in a shaded area according to the present invention.

FIG. 2 is a schematic diagram illustrating a main configuration for selecting a group leader of the user safety monitoring system according to FIG. 1.

FIG. 3 is a schematic diagram exemplarily illustrating a group leader selection method according to an embodiment of the present invention.

FIG. 4 is a flowchart illustrating a group leader selection according to an embodiment of the present invention.

FIGS. 5 and 6 are schematic diagrams exemplarily illustrating a group leader replacement method according to the group leader selection method of the present invention.

FIG. 7 is a flowchart illustrating a safety monitoring method using the user safety monitoring system in the shaded area of FIG. 1.

FIG. 8 is a perspective view illustrating an example in which a plurality of RFID posts are installed on a track in the user safety monitoring system in the shaded area of FIG. 1.

FIG. 9 is a structural diagram illustrating an example of a configuration of a group member terminal, a group leader terminal, and an engineer terminal in the user safety monitoring system in the shaded area of FIG. 1.

FIG. 10 is a structural diagram illustrating an example of a configuration of a control server in the user safety monitoring system in the shaded area of FIG. 1.

BEST MODE FOR CARRYING OUT THE INVENTION

Hereinafter, preferred embodiments of the present invention will be described in detail with reference to the accompanying drawings.

The embodiments of the present invention are provided to more completely explain the present invention to those of ordinary skill in the art, and the following embodiments may be modified in various other forms, and the scope of the present invention is not limited to the following embodiments. Rather, these embodiments are provided to make the present disclosure more faithful and complete, and to completely convey the spirit of the invention to those skilled in the art.

In addition, in the following drawings, a thickness or size of each layer is exaggerated for convenience and clarity of description, and the same reference numerals in the drawings refer to the same elements. As used in this specification, the term "and/or" includes any one and all combinations of one or more of those listed items. In addition, in this specification, "connected" means not only a case where member A and member B are directly connected, but also a case where member A and member B are indirectly connected by interposing member C between member A and member B.

The terms used in this specification are used to describe specific embodiments, and are not intended to limit the present invention. As used in this specification, the singular forms may include the plural forms unless the context clearly indicates other cases. In addition, "comprise" and/or "comprising" when used in this specification specifies the presence of the recited shapes, numbers, steps, actions, members, elements, and/or groups thereof, and does not exclude the presence or addition of one or more other shapes, numbers, actions, members, elements and/or groups.

Although the terms first, second, etc. are used herein to describe various members, parts, regions, layers and/or portions, it is obvious that these members, parts, regions, layers and/or portions should not be limited by these terms. These terms are used only to distinguish one member, component, region, layer or portion from another region, layer or portion. Accordingly, a first member, component, region, layer or portion to be described in detail below may refer to a second member, component, region, layer or portion without departing from the teachings of the present invention.

In addition, a system according to the present invention may be implemented using any suitable hardware, firmware (e.g., application specific semiconductor), software, or any suitable combination of software, firmware and hardware. For example, various components of a system according to the present invention may be formed on one integrated circuit chip, or on separate integrated circuit chips. In addition, the various components of the system may be implemented on a flexible printed circuit film, and may be formed on a tape carrier package and a printed circuit board. In addition, various components included in the system, in one or more computing devices, may be processes or threads executing on the one or more processors, which may execute computer program instructions and interact with other components to perform various functions mentioned below. The computer program instructions are stored in a memory that can be executed in a computing device using a standard memory device, such as, for example, a random access memory. The computer program instructions may also be stored in other non-transitory computer readable media, such as, for example, a CD-ROM, flash drive, etc. In addition, those skilled in the art to which the present invention relates should appreciate that the functionalities of various computing devices may be combined with each other, integrated into one computing device, or the functionality of a particular computing device may be distributed among one or more other computing devices without departing from exemplary embodiments of the present invention.

As an example, a control server according to the present invention may be operated in a typical commercial computer composed of a central processing unit, a mass storage device such as a hard disk or a solid state disk, a volatile memory device, an input device such as a keyboard or mouse, and an output device such as a monitor or printer, but the present invention is not limited thereto.

FIG. 1 is a configuration diagram illustrating a user safety monitoring system in a shaded area according to the present invention.

As illustrated in FIG. 1, a user safety monitoring system 100 in a shaded area may include a short-range communication post 100, a group leader terminal 10' and a group member terminal 20', an engineer terminal 50, and a control server 300.

A plurality of short-range communication posts 100 may be installed to be spaced apart from each other in a work area. A short-range communication tag 110 may be attached to each of the short-range communication posts 100.

The group leader terminal 10' and the group member terminal 20' may be classified according to a preset rule among a plurality of user terminals 10 to 40 (in the present invention, for convenience, description will be made by denoting the group leader terminal by reference numeral 10' and the group member terminal by reference numeral 20').

Hereinafter, before describing the user safety monitoring system, a method of selecting the group leader terminal 10' among the user terminals 10 to 40 will be described.

FIG. 2 is a schematic diagram illustrating a main configuration for selecting a group leader of the user safety monitoring system according to FIG. 1. FIG. 3 is a schematic diagram exemplarily illustrating a group leader selection method according to an embodiment of the present invention. FIG. 4 is a flowchart illustrating a group leader selection method according to an embodiment of the present invention. FIGS. 5 and 6 are schematic diagrams exemplarily illustrating a group leader replacement method according to the group leader selection method of the present invention.

As illustrated in FIG. 2, the group leader selection method using an external wireless shared memory according to an embodiment of the present invention can be largely applied to a control system including the plurality of user terminals 10 to 40, the short-range communication post 100, and the control server 300.

The plurality of user terminals 10 to 40 are movable, and the short-range communication post 100 has a designated location and the location has been delivered to a user in advance. The control server 300 may be provided adjacent to the short-range communication post 100 or provided at a remote location. The short-range communication post 100 has a preset coverage A (cell radius), and may be disposed one for each pre-divided unit.

The user terminals 10 to 40 are respectively owned by users, and a user application (application, hereinafter referred to as an 'app') associated with the control system may be installed in the user terminals 10 to 40. The user terminals 10 to 40 may communicate with the short-range communication post 100 through a short-range wireless communication module mounted in the terminal, and communicate with the control server 300 through a wireless communication module.

For example, the short-range wireless communication module may include a radio frequency identification (RFID) or a near field communication (NFC) module, etc. With an operation of tagging the user terminals 10 to 40 to a target, information stored in a tag may be read or information stored in the user terminals 10 to 40 may be transmitted. In addition, the wireless communication module may include a communication module such as WiFi or 3G/4G/5G communication module.

The user terminals 10 to 40 may communicate with the short-range communication post 100 to be described later through the short-range wireless communication module without the involvement of a separate server (AP or base station). Therefore, it is useful for setting a cluster leader of various IoT-based sensor networks based on ad-hoc (IoT application in shaded areas where GPS access is particularly difficult; e.g., monitoring safety management of subway line user in shaded areas, etc.).

When a user enters a preset coverage A, the user is designated as one preset group member, and the terminal of the user functions as a designated group member or leader. To this end, each of the user terminal 10 to 40 has unique identification information, which may be automatically designated when the user app is installed.

The identification information may include a personal ID for each user to distinguish each terminal, user information matched to the ID, group designation information for distinguishing a pre-designated group, location information of the short-range communication post 100, a recognition time at which the short-range wireless communication tag 110 was recognized, etc. The unique identification information designated for each of the user terminals 10 to 40 is used to distinguish each user, and is used as identification information to distinguish the user when a group leader is selected. The group leader and group member are separately assigned a group ID in addition to the personal ID to unique identification information, so that the group to which the user belongs may be identified.

For example, if one group consists of four users, IDs from ID1 to ID4 may be assigned to four user terminals 10 to 40, respectively. However, this is only an exemplary description, and the number of group members or assigned identification information can be changed as needed.

In addition, the user terminals 10 to 40 read stored information by tagging the short-range communication post 100, and determine whether or not the group leader exists based on the information. If there is no group leader, the user terminals 10 to 40 may determine whether or not to select the group leader according to a preset condition through the user app (this will be described later).

The short-range communication post 100 may include the short-range wireless communication tag 110 and a memory 130 for data storage. The short-range communication post 100 is installed at a designated location to allow the user terminals 10 to 40 to be tagged therewith. In the drawings, the short-range communication post 100 is illustrated as an RFID post for convenience, but is not limited thereto.

The short-range wireless communication tag 110 is also referred to as an external wireless shared memory device. The short-range wireless communication tag 110 may be, for example, an RFID tag or an NFC tag. The short-range wireless communication tag 110 serves only to read identification information from the user terminals 10 to 40 when the user terminals 10 to 40 are tagged therewith. That is, the short-range wireless communication tag 110 does not have a separate CPU function or an antenna function for transmission, and is configured as an active-type short-range wireless communication tag in consideration of a preset cell coverage. Compared to a passive-type short-range wireless communication tag, the active-type short-range wireless communication tag has a structure that can supply external power or a battery, and thus the cell (coverage) radius can be increased up to 100 meters or more compared to the passive-type short-range wireless communication tag.

However, the short-range wireless communication tag 110 is electrically connected to the memory 130, and the memory 130 stores data read from the short-range wireless communication tag 110.

The memory 130 may be divided into a high-order memory 132 and a low-order memory 134, which is not a physical distinction but a controlling distinction. The memory 130 simply stores the identification information transmitted from the user terminals 10 to 40 according to a tagging sequence of the user terminals 10 to 40, and, after a preset time elapses, data is automatically deleted and the memory 130 is reset.

The high-order memory 132 is a memory in which identification information of the user terminals 10 to 40 to be tagged initially is stored, and the low-order memory 134 is a memory in which identification information of the user terminals 10 to 40 to be tagged after the initial tagging is stored. If identification information is stored in the high-order memory 132, a flag_leader of the memory 130 may be read as 1 when the user terminals 10 to 40 contact the short-range wireless communication tag 110. In contrast, if the identification information is not stored in the high-order memory 132, the flag_leader of the memory 130 may be read as 0 when the user terminals 10 to 40 contact the short-range wireless communication tag 110.

When the memory 130 is in a reset state (or state where no user has tagged before initial work starts), it may be defined as a 'group leader memory reset' state, that is, a 'high-order memory=Ø (flag_leader=0)' state (a state where a high prioritized position is empty). In an initialization state of the short-range wireless communication tag 110, any user (e.g., user terminal ID1) may enter coverage A and perform initial tagging on the short-range communication post 100. The first tagged user may be designated as a user to which the authority of the group leader is granted through the user app by determining whether there is information stored in the high-order memory 132. After that, identification information of the user terminals ID2 to ID4 (20 to 40) that are sequentially tagged is stored in the lower-order memory 134 of the memory.

The group leader authority may be continuously maintained while the corresponding user tags the short-range communication post 100 according to a predetermined period. The group leader authority is the authority to exchange work information with the control server 300 on behalf of the group. Accordingly, at the same time as the group leader is selected from among the user terminals 10 to 40, the authority to exchange all information (transmission information: information stored in the short-range wireless communication tag 110, reception information: a command or safety alarm message of the control server 300, other work information) with the control server 300 may be granted (registered) to the user terminal ID1 (10) of the group leader. The work information may include work group information including the number of people in the work group, a group ID, a personal ID for each user, location information for each user, and a current time.

However, if the user deviates from the coverage A or does not periodically tag, the group leader authority is expired. When the group leader authority is expired, the group leader authority may be sequentially transferred to general users stored in the memory according to the tagging sequence.

The control server 300 receives the identification information and a group leader designation result from the user terminal ID1 (10) to which the group leader authority is granted, and transmits work information to the user terminal ID1 (10) of the corresponding user. Since all users have agreed in advance to receive and share the work information through the group leader, when the work information is transmitted to the group leader, the work information may be shared with all users in the group.

The work information may include information (ID, presence or absence of registration, number of group members, etc.) of all group members, management information of group member information, message information (notification of deviation from the coverage A, tagging time notification, safety alarm message, etc.), various work notices, etc.

As illustrated in FIG. 3, one group is composed of four users, and the users may have user terminals ID to ID4 (10 to 40), respectively. All group members may be agreed in advance to enter into the predetermined coverage A for work, execute the user app, and respectively tag short-range wireless communication tag 110 of the short-range communication post 100 and then start the work. In addition, all users are aware that they can be designated as a group leader or a group member, and may be agreed in advance to share work information with other group members when designated as the group leader.

The short-range communication post 100 is disposed one for each pre-divided unit (coverage), and the location of the short-range communication post 100 may be previously known to the users. An example will be described in which each user is in a state in which work is permitted only within a pre-designated location (coverage) of a group to which the user belongs.

For example, as illustrated in FIG. 4, all users may execute the app of the user terminals 10 to 40 (S100) and tag the short-range wireless communication tag 110 (S200). Among the users, a user having the user terminal ID1 may tag the short-range wireless communication tag 110 first, a user having the user terminal ID2 may tag the short-range wireless communication tag 110 second, a user having the user terminal ID3 may tag the short-range wireless communication tag 110 third, and a user having the user terminal ID4 may tag the short-range wireless communication tag 110 fourth.

In this case, the short-range communication post 100 may sequentially store the identification information ID1 to ID4 of the user terminals 10 to 40 tagged with the short-range wireless communication tag 110 in the memory 130 (S210). The identification information of the user terminal 10 initially tagged therewith is stored in the high-order memory 132 in the memory 130, and the identification information of the user terminals 20 to 40 tagged therewith thereafter may be sequentially stored in the low-order memory 134.

In the app of the user terminals 10 to 40, one of the user terminals 10 to 40 may be selected as a group leader according to a preset condition, and the authority may be granted thereto. For example, the preset condition may be set to grant the group leader authority to the user terminals 10 to 40 that are tagged first.

Based on the viewpoint of the user terminal ID (10) that is tagged first, a group leader has not yet been determined. Accordingly, the user terminal ID (10) is tagged with the short-range wireless communication tag 110 to determine whether it is flag_feader=0, so that the presence or absence of the group leader may be determined.

The user terminal ID1 (10) is initially tagged and determines whether there is information stored in the high-order memory 132 of the memory 130, that is, flag_feater=0 (S300). If flag_feater=0, the user terminal ID (10) may be selected as the group leader by the user app of the user terminal ID (10) (S400). Thereafter, the user terminal ID (10) notifies the control server 300 that the user terminal ID1 (10) has been designated as the group leader (S500).

The user terminal ID1 (10) selected as the group leader is granted the authority of the group leader, and thus when the control server 300 transmits the work information described above (S600), the user terminal ID (10) receives the work information and share the work information with the group members.

When the work information is transmitted from the control server 300 to the user terminal that has become the group leader (S600), the work information is stored in the user terminal of the group leader (S700), and the users share the work information and proceed with work. When the work is completed, the user may close the app (S800).

After the group leader is designated after the initial tagging, it becomes flag_feeder=1, and thus when other user terminal ID2 to ID4 are tagged, in step S300, the user terminals 20 to 40 determine that it is not flag_feeder=0, and determine whether their terminals have an ID designated as a group leader (S310, since the users need to periodically tag, even after the group leader is designated, a situation in which the group leader re-tags the short-range wireless communication tag occurs periodically).

When it is determined that the tagged terminal has the ID of the group leader through the identification information of the tagged user terminal, the tagged terminal is the terminal of the group leader, and thus the status of the group leader is maintained. However, if the ID of the user terminal tagged in step S310 is not the ID of the group leader, the user app of the terminal recognizes that the user is a member of the group, and outputs a message that the app can be closed without any additional action so that the user terminates the app, or the user app is automatically terminated (S800).

The group leader authority may be maintained while the user who is granted the authority of the group leader in steps S400 to S600 periodically tags the short-range wireless communication tag 110. While the group leader is maintained, the ID of the corresponding user may be maintained at a high prioritized position (flag_leader=1), to which the authority of the group leader is granted, in the memory. However, if the user does not re-tagging, the memory is automatically reset (S900) after a certain period of time, the user loses the authority of the group leader, and another group leader is automatically selected. Therefore, it is preferable that a 'tagging period ($T_L$)' for tagging by the user is set shorter than a 'reset period $T_M$' in which the memory is reset.

All members of the group, including the group leader, are checked to be located within the coverage A of the short-range communication post 100 by periodically tagging the short-range communication post 100. In this check process, by checking the value of flag_leader whether the high-order memory 132 of the memory 130 is empty, the presence or absence of the group leader in the group may be inspected.

In the app of the user terminals ID1 to ID4, an alarm to guide tagging may be generated at every preset period.

On the other hand, a case where the group leader deviates from the coverage A to perform movement or other work instructions may occur.

As illustrated in FIG. 5, if the user designated as the group leader deviates from the coverage A and the user terminal ID1 is not tagged with the short-range wireless communication tag 110 even after the tagging period $T_L$ has elapsed, the group leader status is automatically lost.

In more detail, if the user terminal ID1, which is the group leader, deviates from the coverage A and is not tagged, the high-order memory 130 on the memory 130 is automatically reset Ø and changed to flag_leader=0.

However, the user terminals ID2 to ID4 of other group members are tagged at the promised tagging period $T_L$, and the user terminals ID2 to ID4 repeat steps S300 to S400 of FIG. 3.

Since it is the flag_leader=0 state, the user terminal (e.g., ID2) that is initially tagged after the user terminal ID1 deviates is stored in the high-order memory 132 of the memory 130, and thus the user terminal (e.g., ID2) may be set as a group leader by the user app.

Therefore, as illustrated in FIG. 6, the user terminal ID2 is designated as a new group leader (new leader). The identification information of the new group leader is transmitted to the control server 300 by the corresponding user terminal ID2, and the control server 300 can transmit work information to the new group leader. That is, the succession of the group leader is made.

In the method described above, the control server 300 may deliver the work information to the group members through the group leader, and may perform work management through the group leader. When the group leader selection method according to the present embodiment is applied, the control server 300 does not manage all group members individually, but only needs to manage the group leader. Accordingly, work management is simplified and management time is reduced, thereby enabling efficient task and user management.

In addition, since transmission of various work information and remote monitoring from the control sensor is possible through the group leader, accurate work according to work instructions is always possible, and there is an effect of improving work efficiency and control efficiency.

In addition, since the post equipped with the RFID tag is disposed for for each work division unit, the group leader is automatically selected by the user having a unique ID tagging the post, and thus there is always the group leader in the work group. Accordingly, it is possible to solve problems such as omission of information transmission due to the absence of the group leader.

When the group leader is selected in the method described above, the user terminal, which is the group leader, becomes a group leader terminal 10', and the remaining user terminals become group member terminal 20'. Hereinafter, the system and method for monitoring the safety of the users in a shaded area will be described.

FIG. 7 is a flowchart illustrating a safety monitoring method using the user safety monitoring system in the shaded area of FIG. 1. FIG. 8 is a perspective view illustrating an example in which a plurality of RFID posts are installed on a track in the user safety monitoring system in the shaded area of FIG. 1.

As illustrated in FIG. 8, a plurality of short-range communication posts 100 may be installed to be spaced apart from each other along the length direction of a track R with track R as a reference. The short-range wireless communication tag 110 may be installed at an appropriate height of the short-distance communication post 100 in consideration of a viewing height of the group member and the group leader (see the description of FIG. 1 for the detailed configuration of the short-range communication post and the short-range wireless communication tag).

Although it is illustrated that four short-range communication posts 100 are disposed to be spaced apart along one side of the track R in FIG. 8, the plurality of short-range communication posts may be disposed to be spaced apart from each other along one side and/or the other side. In the present invention, the location and number of short-distance communication posts 100 installed are not limited. In addition, for the convenience of description, description will be made on a case in which the short-range communication posts 100 includes a first RFID post 110A, a second RFID post 110B, a third RFID post 110C, and a fourth RFID post 110D sequentially installed to be spaced apart from each other along the length direction on one side of the track R and these RFID posts include the RFID tags 111A, 111B, 111C, and 111D, respectively.

Location information of the first RFID post, the second RFID post, the third RFID post, and the fourth RFID post may be stored in the RFID tags 111A, 111B, 111C, and 111D, respectively. The first RFID post 110A, the second RFID post 110B, the third RFID post 110C, and the fourth RFID post 110D may respectively have cell coverages that are areas in which the RFID tags 111A, 111B, 111C, and 111D can be recognized. Here, the cell coverage may be an area within a predetermined radius around the RFID posts 110A, 110B, 110C, and 110D. In addition, some areas of the cell coverages of the RFID posts 110A, 110B, 110C, and 110D may overlap. In addition, when the group member terminal 20' and the group leader terminal 10' respectively recognize the RFID tags 111A, 111B, 111C, and 111D according to the work area, a recognition state may be maintained within the cell coverage of each of the RFID posts 110A, 110B, 110C, and 110D. Here, the work area may be an area for a work group composed of group members and a group leader to perform work, and may include the cell coverage of at least one RFID post 110A, 110B, 110C, and 110D. That is, the work area may include the cell coverage of one RFID post 110A, 110B, 110C, and 110D or the cell coverages of two or more adjacent RFID posts 110A, 110B, 110C, and 110D.

In addition, although the group leader terminal 10' and the group member terminal 20' are illustrated separately for convenience of description, when the short-range wireless communication tag 110 of the short-range communication post 100 is recognized by the plurality of user terminals 10 to 40, one terminal may be automatically selected as the group leader terminal 10'. As an example, the group leader terminal 10' may be a terminal that initially recognizes the short-range wireless communication tag 110 among the user terminals 10 to 40 at the start of work, but the present invention is not limited thereto. Here, the user terminals 10 to 40 may include the group member terminal 20' and the group leader terminal 10'.

Here, as illustrated in FIGS. 1 and 2, the user terminals 10 to 40 may receive location information (post ID) of the RFID post and transmit the user ID by recognizing the short-range wireless communication tag 110 through the short-range communication network, respectively. In addition, the group leader terminal 10', the group member terminal 20', the control server 300, and the engineer terminal 50 may transmit/receive data through a wireless communication network. In more detail, the wireless communication network may serve to mutually transmit information and data between the group leader terminal 10' and the group member terminal 20', between the group leader terminal 10' and the control server 300, and between the engineer terminal 50 and the control server 300. Here, the wireless communication network may be an LTE-R network, which is an integrated railway wireless network, WiFi, and other wireless communication networks.

In addition, although the group member terminal 20' and the engineer terminal 50 are respectively illustrated as one terminal, may be a plurality of terminals, and in the present invention, the number of the group member terminal 20' and engineer terminal 50 is not limited. However, the group leader terminal 10' may be one terminal selected from among the user terminals 10 to 40.

Although the engineer terminal 50 may be a wired or wireless communication device, such as a computer, such as a notebook, a desktop or a laptop installed or embedded in the driver's seat, or may be all kinds of handheld-based wireless communication devices such as a personal communication system (PCS) terminal, global system for mobile communications (GSM) terminal, personal digital cellular (PDC) terminal, personal handyphone system (PHS) terminal, personal digital assistant (PDA) terminal, international mobile telecommunication (IMT)-2000 terminal, code division multiple access (CDMA)-2000 terminal, W-code division multiple access (W-CDMA) terminal, wireless broadband internet (Wibro) terminal, smartphone, smartpad, tablet PC, etc., the present invention is not limited thereto. Of course, the group leader terminal 10' and the group member terminal 20' may also be handheld-based wireless communication devices.

When the group leader terminal 10', the group member terminal 20', and the engineer terminal 50 are handheld-based wireless communication devices, they can be implemented by mounting various open operating systems. Examples of open operating systems may include Nokia's Symbian, RIMS' Blackberry, Apple's iPhone, Microsoft's Windows Mobile, Google's Android, Samsung Electronics' sea, etc. In addition, when the examiner terminal 110 and the examinee terminal 120 use an open operating system, the user may arbitrarily install and manage various applications, unlike a mobile phone (also known as "feature phone") having a closed operating system.

FIG. 9 is a structural diagram illustrating an example of a configuration of the group member terminal, the group leader terminal, and the engineer terminal in the user safety monitoring system in the shaded area of FIG. 1. FIG. 10 is a structural diagram illustrating an example of a configuration of the control server in the user safety monitoring system in the shaded area of FIG. 1.

Hereinafter, the group leader terminal 10', the group member terminal 20', and the engineer terminal 50 will be referred to as user terminals 10 to 50.

As illustrated in FIG. 9, the user terminals 10 to 50 may basically include a control unit 11, a memory unit 12, a screen output unit 13, a key input unit 14, a sound input and output unit 15, a camera 16, a communication module 17, etc.

The control unit 11 is a generic term for a functional configuration that controls an operation of the user terminals 10 to 50, includes at least one processor and an execution memory, and is connected to each functional configuration unit provided in the user terminals 10 to 50 through a bus.

The control unit 11 loads, through the processor, at least one program code provided in the user terminals 10 to 50 into the memory unit 12, operates and executes the at least one program code, and transmitting the result to at least one functional configuration unit through the bus.

The memory unit 12 is a generic term for non-volatile memories provided in the user terminals 10 to 50, and stores and maintains at least one program code executed through the control unit 11 and at least one data set in which the program code is used. The memory unit 12 basically stores a system program code and system data set corresponding to the operating system of the user terminals 10 to 50, a communication program code and communication data set for processing a wireless communication connection of the user terminals 10 to 50, and at least one application program code and application data set, and a program code and data set for a dedicated application (or website) for implementing the present invention are also stored in the memory unit.

The screen output unit 13 is composed of a screen output device (e.g., a display device such as an LCD or LED device) and an output module driving the same, and may control that a dedicated application (or website) for implementing the present invention is output through the screen output device.

The key input unit 14 is composed of a key input device provided with at least one key button (or a touch screen device interlocking with the screen output device) and an input module driving the same, and a user may input a setting for driving the dedicated application (or web site) implementing the present invention through the key input unit 14.

The sound input and output unit 15 may be composed of a speaker for outputting a sound signal, a microphone for inputting the sound signal, and a sound module. The sound input and output unit 15 is connected to the control unit 11 by the bus and outputs an operation result corresponding to a sound output among various operation results of the control unit 11 through the speaker. The sound module decodes sound data to be output through the speaker and converts the sound data into a sound signal. The sound input and output unit 15 delivers sound data input through the microphone to the control unit 11. In this case, the sound module may encode a sound signal input through the microphone and delivers the sound signal to the control unit 11. Here, in the case of a personal computer, the sound input and output unit 15 may not be provided separately.

The camera 16 is composed of an optical unit, a charge coupled device (CCD), and a camera module driving the same, and acquires bitmap data input to the CCD through the optical unit. Here, in the case of a personal computer, the camera 16 may not be provided separately.

The communication module 17 may include a wireless communication module 18 and a short-range communication module 19 depending on the communication network used.

The wireless communication module 18 refers to a module for connecting to the wireless communication network, and the wireless communication module 18 may be embedded in or external to the user terminals 10 to 50. The wireless communication module 18 of each of the group leader terminal 10' and the engineer terminal 50 may transmit and receive a signal for safety monitoring of the user through the wireless communication network with the control server 300. In addition, the wireless communication module 18 of the group member terminal 20' may transmit identification information, which is information about a user ID and location, to the group leader terminal 10' through the wireless communication network. Such a wireless communication module 18 is connected to the control unit 11 by the bus, transmits various operation results of the control unit 11 through the wireless communication network, or receives data through the wireless communication network, and transmits the data to the control unit 11, and at the same time, maintains procedures of access, registration, communication, and handoff with the wireless communication network.

The short-range communication module 19 refers to a module for short-range communication. For short-range communication, Bluetooth, radio frequency identification (RFID), infrared data association (IrDA), ultrawideband (UWB), ZigBee, etc. may be used. Through the short-range communication module 19 as described above, the group member terminal 20' and the group leader terminal 10' may recognize the short-range wireless communication tag 110 mounted on the short-range communication post 100. Of course, the short-distance communication module is also connected to the control unit by the bus, receives location information of the short-range communication post mounted with the short-range communication tag 110 and recognized through the short-range communication module, and transmits the location information to the control unit 11, and at the same time, maintains the procedure of access, registration, communication, and handoff with the short-range communication network.

The control server 300 may transmit and receive data through the wireless communication network with the group leader terminal 10' and the engineer terminal 50. Of course, the control server 300 may transmit and receive data and information after an application, website, or program (hereinafter "dedicated application") for user safety monitoring in the shaded area is executed in the group leader terminal and the engineer terminal. Of course, the control server 300 may perform a function of providing various interface screens and sounds implemented after the dedicated application is executed in the group leader terminal 10' and the engineer terminal 50.

The control server 300 may include a server control unit 310, a communication unit 320, a database 330, a display unit 340, and an input unit 350.

The server control unit 310 may determine whether the users are in danger by comparing work group information, which is information of users in the work area transmitted from the group leader terminal 10' in real time, with train operation information. When it is determined that the work group is in a dangerous situation, the server control unit 310 may provide a warning and a notification sound to the group leader terminal 10' and the engineer terminal 50.

The communication unit 320 is a generic name of a communication configuration for communication and connection through the wireless communication network, and may be configured to include at least one of an antenna for transmitting and receiving a radio frequency signal of a specific frequency band, an RF module, a baseband module, a signal processing module, and a wired communication module. The communication unit 320 may be connected to the database 330 and the server control unit 310 by a bus. The communication unit 320 may transmit and receive data and/or information to and from the group leader terminal 10' and the engineer terminal 50 through the wireless communication network.

The database 330 may store the train operation information and work group information in the work area transmitted from the group leader terminal 10'. Of course, the train operation information and work group information may be periodically updated and changed under the control of the server control unit 310.

The display unit 340 may display the content selected through the input unit 350 of the control server 300. In addition, the input unit 350 may be composed of a key input device (or a touch screen device interlocking with the screen output device) provided with at least one key button and an input module driving the key input device.

As illustrated in FIG. 7, the user safety monitoring method in the shaded area may include an RFID recognition step S1, an identification information transmission step S2, a work group information transmission step S3, a comparison step S4, a step-of-determining-whether-dangerous situation-is-present S5, a notification step S6, a safety securement transmission step S7, a deceleration warning release step S8, and a work completion check step S9.

In the RFID recognition step S1, each of the user terminals 10 to 40 included in the work group may recognize the short-range wireless communication tag 110 of the short-range communication post 100 installed in the work area. In each of the user terminals 10 to 40, the short-range wireless communication tags 110 may be recognized through a short-range communication module 117c in a state in which the dedicated application is executed. In this case, the user terminals 10 to 40 may operate as RFID readers.

When the user terminals 10-40 respectively recognize the short-range wireless communication tag 110 of the short-range communication post 100 installed in the work area, one terminal among the user terminals 10 to 40 may be automatically selected as the group leader terminal 10'. As an example, the group leader terminal 10' may be a terminal that initially recognizes the short-range wireless communication tag 110 among the user terminals 10 to 40 at the start of work, but the present invention is not limited thereto. In addition, when the group leader terminal 10' deviates from the work area, the group leader authority is lost, and one of the user terminals 10 to 40 in the work area may be automatically selected as the new group leader terminal 10'. Of course, in the user terminals 10 to 40 that have left the work area, a notification sound indicating that the users have left the work area may be generated through the sound input and output unit 15 from the dedicated application. That is, the users can check in real time whether or not the users have left the work area through the notification sound provided from the user terminals 10 to 40. In addition, when the user terminals 10 to 40 return to the work area after deviating from the work area, the user terminals 10 to 40 may re-recognize the short-range wireless communication tag of the short-range communication post and be included in the work group.

In addition, the user ID may be automatically stored in the short-range wireless communication tag 110 recognized by the user terminals 10 to 40. In the short-range wireless communication tag 110, the stored user ID may be automatically expired when the recognition reference time elapses. Of course, while work is in progress in the work area, the user terminals 10 to 40 need to re-recognize the short-range wireless communication tag 110 before the recognition reference time elapses. That is, the user terminals 10 to 40 should periodically recognize the short-range wireless communication tag 110 of the short-range communication post 100 provided in the work area before the lapse of the recognition reference time. In addition, when the user terminals 10 to 40 are located within the cell coverage of the short-range communication post 100 within the recognition reference time, the recognition state may be maintained.

Details of the selection, replacement, and change of the group leader among the user terminals 10 to 40 in the RFID recognition step S1 have been described with reference to FIGS. 2 to 6, and the detailed steps have been described with reference to FIG. 4, and thus a detailed description thereof will be omitted.

Here, the user ID may include a group ID and a personal ID for each user. In addition, each of the group member terminal 20' and the group leader terminal 10' may receive a post ID, which is location information of the short-range communication post 100 to which the recognized short-range wireless communication tag 110 is attached. Through this, the designated work area can be checked in the group member terminal 20' and the group leader terminal 10'.

The work area may be set between the control server 300 and the user terminals 10 to 40 before the users start work. Additionally, in the group leader terminal 10', the work area may be reduced or expanded through the dedicated application. Of course, the work area expanded in the group leader terminal 10' may be approved through a check process of the control server 300. In addition, at least one short-range communication post 100 may be installed in the work area. In addition, when a plurality of short-range communication posts 100 are installed in the work area, an area including all cell coverages of the plurality of short-range communication posts 100 may be the work area.

In the identification information transmission step S2, identification information, which is information obtained by recognizing the short-range wireless communication tag 110 by the group member terminal 20' may be transmitted to the group leader terminal 10'. This identification information transmission step S2 may be performed in real time after the RFID recognition step S1. Here, the identification information may include location information of the short-range communication post 100 recognized by the group member terminal 20', a recognition time at which the short-range wireless communication tag 110 is recognized, and a user ID. Of course, when the user terminals 10 to 40 are within the work area in which GPS transmission and reception are possible, GPS location information of each of the user terminals 10 to 40 may be used as the location information. In this case, the location information of the user may include both the post ID and the GPS location information.

The group leader terminal 10' may receive identification information of at least one group member terminal 20' through the wireless communication module 18 in a state where the dedicated application is executed. In addition, the group member terminal 20' may transmit the identification information at a constant period.

In the work group information transmission step S3, the group leader terminal 10' may transmit work group information including both the identification information received from the group member terminal 20' and the identification information of the group leader terminal 10' to the control server 300 in real time. Of course, the group leader terminal 10' may receive and update identification information at a constant period from the group member terminal 20' and transmit the work group information to the control server 300 at the same period. Here, the constant period may be set within 1 minute for the safety of users, but the present invention is not limited thereto. However, it is preferable to set the constant period to be shorter than the reference time for determining the dangerous situation in the step-of-determining-whether-dangerous situation-is-present S5.

Here, the work group information may include the number of people in the work group, a group ID, a personal ID for each user, location information for each user, and a current time. The group leader terminal 10' may serve as a communication intermediary between the group member terminal 20' and the control server 300, and may prevent communication overload that may occur when the plurality of user terminals 10 to 40 directly communicate with the control server 300. That is, since the control server 300 communicates with one group leader terminal 10', communication and management efficiency can be improved.

In the comparison step S4, the control server 300 may compare the work group information with the train operation information. The control server 300 may display the location and time information of the work group among work group information received through the communication unit 320, and the location and time information of the train among the train operation information extracted from the database 132 on the display unit 340 in real time. On the display unit 340 of the control server 300, a map of the work area and location information of trains operating in an adjacent area may be displayed in real time.

In this case, in the control server 300, the server control unit 310 may calculate a result value by comparing the location and time information of the work group with the location and time information of the train. For example, when the work group is located in the work area at 11:29 and the train is scheduled to arrive in the work area at 11:31, the server control unit 310 of the control server 300 may calculate the result value as 2 minutes.

In the step-of-determining-whether-dangerous situation-is-present S5, the control server 300 may compare the result value with the reference time and determine that it is a dangerous situation when the result value is equal to or shorter than the reference time. Here, the reference time may be set to 3 minutes, but this is a numerical value that can be changed in various ways, and the present invention is not limited thereto. However, it is preferable to set the reference time to at least twice the constant period for transmitting the identification information and the work group information.

In the notification step S6, when the control server 300 determines that it is a dangerous situation, the group leader terminal 10', the control server 300 may notify the dangerous situation to the group leader terminal 10', the group member terminal 20', and the engineer terminal 50. In this case, the group leader terminal 10', the group member terminal 20', and the engineer terminal 50 may generate a notification sound through the sound input and output unit 15, and the users and engineer can check the dangerous situation in real time through the notification sound. Additionally, the group leader terminal 10', the group member terminal 20', and the engineer terminal 50 may display a real-time location of the train and the time to arrive in the work area through the screen output unit 13.

Additionally, the control server 300 may request the driver terminal 50 to decelerate and operate the train for the safety of the work group. In this time, the engineer who has checked the deceleration operation request received from the engineer terminal 50 may control the train to be decelerated to a low speed and operated.

In the safety securement transmission step S7, after receiving the notification from the control server 300, the group leader terminal 10' may transmit safety securement information indicating that all users included in the work group have secured a safe distance from the work area.

In the deceleration warning release step S8, when the control server 300 receives safety information from the group leader terminal 10', the control server 300 may request the engineer terminal 50 to release the deceleration warning of the train. In this case, the engineer who has checked the deceleration release request received from the engineer terminal 50 may control the train to operate at a normal running speed.

In the work completion check step S9, when work is completed, it can be checked that the work is completed on the dedicated application in the group leader terminal 10' and the group member terminal 20'. When the work is not completed, the group leader terminal 10' and the group member terminal 20' may repeatedly perform the RFID recognition step S1, the identification information transmission step S2, the work group information transmission step S3, the comparison step S4, the step-of-determining-whether-dangerous situation-is-present S5, the notification step S6, the safety securement transmission step S7, and the deceleration warning release step S8 according to a situation.

In the user safety monitoring system and method thereof in the shaded area, the control server compares the location of the work group with operation information about trains and makes notification that the work group is in danger when it is determined that the work group is in danger, thereby capable of securing the safety of the work group. In addition, in the user safety monitoring system and method thereof in the shaded area, the control server can receive the location and work group information of all users by communicating with one group leader terminal, so that communication and management efficiency can be improved.

The matters that have been described above is only one embodiment for carrying out the present invention. The present invention is not limited to the embodiments described above, and as claimed in the following claims, it will be said that the technical spirit of the present invention exists to the extent that various modifications can be made by anyone with ordinary knowledge in the field to which the invention belongs without departing from the gist of the present invention.

INDUSTRIAL APPLICABILITY

The present invention can be applied to a technical field where it is necessary to automatically select a group leader within a group when a plurality of users form a group and perform predetermined work in a specific area, and to a case where work is performed in a shaded area where GPS transmission and reception are not smooth.

The invention claimed is:

1. A user safety monitoring method in a shaded area comprising:
   an RFID recognition step of recognizing, by each of user terminals, a short-range wireless communication tag mounted on a short-range communication post installed in a work area and automatically selecting a group leader terminal from among the user terminals;
   an identification information transmission step of transmitting, by group member terminals among the user terminals, identification information to the group leader terminal;
   a work group information transmission step of transmitting, by the group leader terminal, work group information including the identification information received from the group member terminal and identification information of the group leader terminal to a control server;
   a comparison step of comparing, by the control server, the work group information and train operation information to calculate a result value;
   a step-of-determining-whether-dangerous situation-is-present of determining whether the work group is in danger, by the control server, by comparing the result value with a reference time; and
   a notification step of notifying the group member terminal, the group leader terminal, and an engineer terminal of a danger situation when the control server determines that the work group is in danger.

2. The method of claim 1, wherein, in the RFID recognition step, the group member terminal and the group leader terminal receive location information of the short-range communication post from the short-range wireless communication tag mounted on the short-range communication post.

3. The method of claim 1, wherein, in the identification information transmission step and the work group information transmission step, the identification information and the work group information are transmitted at regular intervals, respectively.

4. The method of claim 1, wherein, when the group member terminal or the group leader terminal deviates from the work area, by notifying the work area deviation through a notification sound, the group member terminal or the group leader terminal is induced to return to the work area, and
   when the group member terminal or the group leader terminal returns to the work area, the group member terminal or the group leader terminal recognizes the short-range wireless communication tag of the short-range communication post again and is included in the work group.

5. The method of claim 4, wherein, when the group leader terminal deviates from the work area, one terminal among the user terminals is automatically selected as a new group leader terminal.

6. The method of claim 1, wherein, a user ID recognized by the user terminals is automatically stored in the short-range wireless communication tag, a recognition state is maintained when the user terminals are located within a cell coverage of the short-range communication post within a recognition reference time, the user ID stored in the short-range wireless communication tag is automatically expired when the recognition reference time elapses, and
   the user terminals are required to periodically re-recognize the short-range wireless communication tag of the short-range communication post installed in the work area before the recognition reference time elapses in order to work in the work area.

7. The method of claim 1, wherein,
in the comparison step,
the control server compares a location and time information of the work group in the work group information received from the group leader terminal and a location and time information of a train in train operation information extracted from a database of the control server, and
calculates a result value that is a difference between the time at which users are located in the work area and the time when the train is expected to arrive in the work group.

8. The method of claim 1, wherein, in the step-of-determining-whether-dangerous situation-is-present, when the result value is equal to or shorter than the reference time, the control server determines that it is a dangerous situation.

9. The method of claim 1, wherein, in the notification step, the control server requests the engineer terminal to decelerate and operate the train.

10. The method of claim 1, further comprising:
after the notification step,
a safety securement transmission step of transmitting, by the group leader terminal, safety securement information indicating that all users included in the work group have secured a safe distance from the work area to the control server; and
a deceleration warning release step of requesting, by the control server, the engineer terminal to release a deceleration warning of the train and operate in a normal running.

11. The method of claim 1, wherein, the identification information includes a user ID consisting of a group ID and a personal ID for each user, location information of the short-range communication post, and a recognition time at which the short-range wireless communication tag is recognized.

12. The method of claim 1, wherein, the work group information includes the number of people in the work group, a group ID, a personal ID for each user, location information for each user, and a current time.

13. A group leader selection method comprising:
a step of sequentially tagging a plurality of first to N-th user terminals belonging to a preset group to a short-range wireless communication tag of a short-range communication post within a predetermined coverage (S200);
a step of determining, by each of the user terminals, whether a high-order memory in a memory of the short-range communication post is empty (flag_leader=0) (S300);
a step of selecting a user terminal that has identified that the high-order memory is empty as a group leader if the high-order memory is empty in the step S300 (S400);
a step of transmitting identification information of the user terminal selected as the group leader to the control server (S500); and
a step of transmitting work information from the control server to the user terminal selected as the group leader (S600).

14. The method of claim 13, wherein, in the steps S400 to S600, a status of the group leader is maintained while the first user terminal is tagged with the short-range wireless communication tag according to a preset tagging period $T_L$.

15. The method of claim 14, wherein, in the memory, the group leader selection information is reset when a preset reset period $T_M$ comes.

16. The method of claim 15, wherein, the tagging period $T_L$ is shorter than the reset period $T_M$.

17. The method of claim 13, further comprising:
a step of executing a user app before the step S200 (S100);
a step of storing the identification information of the user terminal in the memory of the short-range communication post between the steps S200 and S300 according to a tagging sequence (S210); and
a step of storing the work information in the user terminal selected as the group leader after the step S600 (S700).

18. A group leader selection method comprising:
a step of sequentially tagging a plurality of first to N-th user terminals belonging to a preset group to a short-range wireless communication tag of a short-range communication post within a predetermined coverage (S200);
a step of storing identification information of the user terminal in a memory of the short-range communication post according to a tagging sequence (S210);
a step of reading a memory value of the short-range communication post and comparing the memory value with a preset criterion in an app of the user terminal (S300);
a step of selecting any one of the plurality of user terminals as a group leader according to the preset criterion (S400);
a step of transmitting identification information of the user terminal selected as the group leader to the control server (S500); and
a step of transmitting work information from the control server to the user terminal selected as the group leader (S600).

19. The method of claim 18, wherein, in the step S300, the user terminal that is initially tagged with the short-range wireless communication tag is selected as the group leader.

20. The method of claim 18, wherein, in the steps S400 to S600, a status of the group leader is maintained while the first user terminal is tagged with the short-range wireless communication tag according to a preset tagging period $T_L$.

21. The method of claim 20, wherein, in the memory, the group leader selection information is reset when a preset reset period $T_M$ comes.

22. The method of claim 21, wherein, the tagging period $T_L$ is shorter than the reset period $T_M$.

* * * * *